(12) United States Patent
Kuo et al.

(10) Patent No.: US 12,055,653 B2
(45) Date of Patent: Aug. 6, 2024

(54) VEHICULAR RADAR AUXILIARY JIG, VEHICULAR RADAR MOUNTING METHOD AND VEHICULAR RADAR DETECTING METHOD

(71) Applicant: TUNG THIH ELECTRONIC CO., LTD., Taoyuan (TW)

(72) Inventors: Hsuan-Yi Kuo, Taoyuan (TW); Cheng-Chuan Wang, Taoyuan (TW)

(73) Assignee: TUNG THIH ELECTRONIC CO., LTD., Taoyuan (TW)

( * ) Notice: Subject to any disclaimer, the term of this patent is extended or adjusted under 35 U.S.C. 154(b) by 449 days.

(21) Appl. No.: 17/356,551

(22) Filed: Jun. 24, 2021

(65) Prior Publication Data
US 2022/0357422 A1 Nov. 10, 2022

(30) Foreign Application Priority Data
May 6, 2021 (TW) .................. 110116366

(51) Int. Cl.
*G01S 7/02* (2006.01)
*G01S 13/931* (2020.01)

(52) U.S. Cl.
CPC ............ *G01S 7/027* (2021.05); *G01S 13/931* (2013.01); *G01S 2013/93271* (2020.01); *G01S 2013/93272* (2020.01)

(58) Field of Classification Search
CPC ........... G01S 7/027; G01S 2013/93271; G01S 2013/93272
See application file for complete search history.

(56) References Cited

U.S. PATENT DOCUMENTS

| | | | |
|---|---|---|---|
| 6,714,156 B1* | 3/2004 | Ibrahim | G01S 7/4026 |
| | | | 342/174 |
| 7,424,387 B1* | 9/2008 | Gill | G01B 11/272 |
| | | | 33/288 |
| 8,794,578 B2* | 8/2014 | Lin | H01Q 1/125 |
| | | | 343/890 |
| 10,921,426 B2* | 2/2021 | Tang | G01S 7/4017 |
| 11,243,074 B2* | 2/2022 | DeBoer | G01B 11/275 |
| 11,313,946 B2* | 4/2022 | Cejka | G01S 7/40 |
| D954,479 S * | 6/2022 | Wang | D6/681.1 |
| 11,390,289 B2* | 7/2022 | Corghi | G01S 13/931 |

(Continued)

*Primary Examiner* — Marcus E Windrich

(57) ABSTRACT

A vehicular radar auxiliary jig includes a transverse extensible bar, two longitudinal extensible bars and two upright bars. The longitudinal extensible bars are perpendicularly connected to two ends of the transverse extensible bar, respectively. One end of each longitudinal extensible bar is positioned distal to the transverse extensible bar and provided with a tire securing portion. The upright bars are perpendicularly connected to two ends of the transverse extensible bar and are perpendicular to the longitudinal extensible bars, respectively. One end of each upright bar is positioned distal to the transverse extensible bar and provided with a mounting portion, thereby connecting to an electromagnetic wave component. A vehicular radar mounting method and vehicular radar detecting method, each using the vehicular radar auxiliary jig, are provided. The vehicular radar auxiliary jig, vehicular radar mounting method and vehicular radar detecting method enable a vehicular radar to be mounted and tested efficiently.

6 Claims, 3 Drawing Sheets

(56) References Cited

U.S. PATENT DOCUMENTS

| | | | |
|---|---|---|---|
| 2004/0165174 A1* | 8/2004 | Knoedler | G01M 11/067 340/992 |
| 2008/0147274 A1* | 6/2008 | Ko | G01S 17/87 701/41 |
| 2013/0325252 A1* | 12/2013 | Schommer | G01S 7/52004 701/33.1 |
| 2017/0003141 A1* | 1/2017 | Voeller | G05D 1/0088 |
| 2019/0187249 A1* | 6/2019 | Harmer | G01S 7/40 |
| 2019/0249985 A1* | 8/2019 | Stieff | G01B 11/2755 |
| 2019/0331482 A1* | 10/2019 | Lawrence | G01B 11/2755 |
| 2020/0355792 A1* | 11/2020 | Tang | G01S 7/4021 |
| 2021/0173060 A1* | 6/2021 | Bartkowiak | F16B 1/00 |
| 2021/0341599 A1* | 11/2021 | Rozewicz | G01S 13/42 |

\* cited by examiner

VEHICULAR RADAR AUXILIARY JIG, VEHICULAR RADAR MOUNTING METHOD AND VEHICULAR RADAR DETECTING METHOD

CROSS-REFERENCE TO RELATED APPLICATION

This non-provisional application claims priority under 35 U.S.C. § 119(a) on Patent Application No(s). 110116366 filed in Taiwan, R.O.C. on May 6, 2021, the entire contents of which are hereby incorporated by reference.

BACKGROUND OF THE INVENTION

1. Field of the Invention

The present disclosure relates to an auxiliary jig, component mounting method and detecting method, and in particular to a vehicular radar auxiliary jig, vehicular radar mounting method and vehicular radar detecting method.

2. Description of the Related Art

Radar (radio detection and ranging), i.e., wireless detection and ranging technology, entails emitting radio waves in fixed directions into free space. The intercepted radio waves that hit a target in the free space are reflected back, received and calculated to figure out the location, height and speed of the target and delve into the shape of the target. In recent years, vehicles are increasingly likely to be equipped with radars to perform ranging and give alerts.

Prior to its delivery, a vehicle must undergo a verification test conducted with a radar. However, the vehicle will fail the test even if the angle, height or location of the radar installed is just slightly wrong. Furthermore, the radar-based test requires collecting the reflecting wave data after radar waves have been sent to a radar reflecting board. However, a problem that remains unsolved is how to precisely adjust the distance, angle and height of the radar reflecting board relative to a target vehicle in order to position the radar reflecting board at a predetermined target location and thereby render the collected reflecting wave data accurate.

The CSC-TOOL of Hella Gutmann Solutions GmbH adjusts the location and angle of the radar reflecting board relative to a target vehicle semi-automatically; however, it and its applicable software are expensive. As a result, manufacturers usually adjust the radar reflecting board manually. Manual adjustment not only relies upon technicians' experience but is also predisposed to inaccuracy of the data collected.

BRIEF SUMMARY OF THE INVENTION

To overcome the aforesaid drawbacks of conventional vehicular radars, the present disclosure provides a vehicular radar auxiliary jig, vehicular radar mounting method and vehicular radar detecting method.

In order to achieve the above and other objectives, the present disclosure provides a vehicular radar auxiliary jig comprising: a transverse extensible bar; two longitudinal extensible bars perpendicularly connected to two ends of the transverse extensible bar, respectively, wherein an end of each said longitudinal extensible bar is positioned distal to the transverse extensible bar and provided with a tire securing portion; and two upright bars perpendicularly connected to two ends of the transverse extensible bar and are perpendicular to the two longitudinal extensible bars, respectively, wherein an end of each upright bar is positioned distal to the transverse extensible bar and provided with a mounting portion, so as to be connected to an electromagnetic wave component.

In an embodiment of the present disclosure, the two upright bars are extensible bars.

In an embodiment of the present disclosure, the mounting portion is a clamp for clamping an electromagnetic wave reflecting component.

In an embodiment of the present disclosure, the mounting portion comprises a base and an angle plotting board having an end disposed at the base, and the angle plotting board is adapted to mount an electromagnetic wave emitting component in place.

In an embodiment of the present disclosure, the angle plotting board is rotatably disposed at the base.

In an embodiment of the present disclosure, the transverse extensible bar comprises two outer bars and an inner bar connecting the two outer bars.

The present disclosure further provides a vehicular radar mounting method using a vehicular radar auxiliary jig, the vehicular radar auxiliary jig comprising a transverse extensible bar, two longitudinal extensible bars and two upright bars, the vehicular radar mounting method comprising the steps of: adjusting the transverse extensible bar to allow length of the transverse extensible bar to match a target vehicle; fixing tire securing portions of the two longitudinal extensible bars to two tires of the target vehicle, respectively; adjusting length of the two longitudinal extensible bars; and mounting an electromagnetic wave emitting component on the target vehicle by attaching the electromagnetic wave emitting component to an angle plotting board of the upright bars.

In an embodiment of the present disclosure, the vehicular radar mounting method further comprises adjusting the angle plotting board to attain a predetermined angle.

The present disclosure further provides a vehicular radar detecting method using a vehicular radar auxiliary jig, the vehicular radar auxiliary jig comprising a transverse extensible bar, two longitudinal extensible bars and two upright bars, the vehicular radar detecting method comprising the steps of: adjusting the transverse extensible bar to allow length of the transverse extensible bar to match a target vehicle; fixing tire securing portions of the two longitudinal extensible bars to two tires of the target vehicle, respectively; adjusting length of the two longitudinal extensible bars; and clamping an electromagnetic wave reflecting component with a clamp of each said upright bar.

In an embodiment of the present disclosure, the vehicular radar detecting method further comprises adjusting the height of the upright bars.

Therefore, the vehicular radar auxiliary jig and the vehicular radar mounting method of the present disclosure provide an angle plotting board whose angle has been configured; hence, no angle deviation will occur, provided that the radar component is mounted in place at the predetermined location of the target vehicle by being attached to the angle plotting board. In addition, the vehicular radar auxiliary jig of the present disclosure is effective in fixing the distance between the target vehicle and the electromagnetic wave reflecting component, such that the testing environment can achieve a unified standard to match a radar test program. The vehicular radar detecting method of the present disclosure is easier to operate, simpler and cheaper than its conventional counterpart.

DETAILED DESCRIPTION OF THE INVENTION

To facilitate understanding of the object, characteristics and effects of this present disclosure, embodiments together with the attached drawings for the detailed description of the present disclosure are provided.

Figure 1:
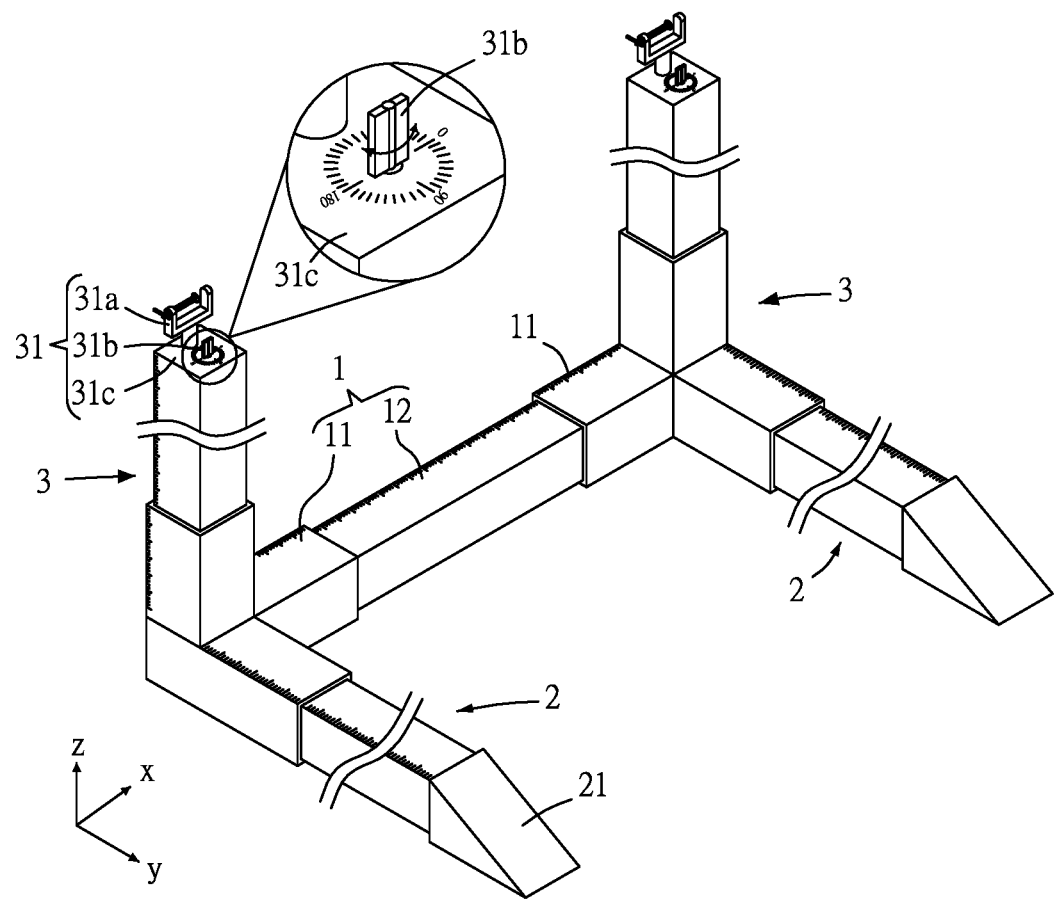
FIG. 1 is a perspective view of a vehicular radar auxiliary jig according to an embodiment of the present disclosure.

As shown in FIG. 1, in an embodiment of the present disclosure, a vehicular radar auxiliary jig 100 comprises a transverse extensible bar 1, two longitudinal extensible bars 2 and two upright bars 3.

The transverse extensible bar 1 can be extended adjustably in a transverse direction (X axis of FIG. 1). In this embodiment, the transverse extensible bar 1 comprises two outer bars 11 and an inner bar 12 telescopically connected between the two outer bars 11. The total length of the transverse extensible bar 1 can be adjusted by adjusting the extent to which the inner bar 12 is slid within the outer bars 11. However, the present disclosure is not limited thereto, and thus the transverse extensible bar 1 may be any conventional extensible bar, such as a combination of an outer bar 11 and an inner bar 12 or may be a combination of much more tubular elements. In this embodiment, the transverse extensible bar 1 is a bar. However, the present disclosure is not limited thereto, and thus the transverse extensible bar 1 may be a rod or any other tubular element or may be a combination of a rod and a bar. Preferably, the cross section of each end of the transverse extensible bar 1 is a square or a rectangle, such that the vehicular radar auxiliary jig 100 stands steadily.

The two longitudinal extensible bars 2 are perpendicularly connected to the two ends of the transverse extensible bar 1, respectively. Likewise, the longitudinal extensible bars 2 can be extended adjustably in a longitudinal direction (Y axis of FIG. 1). The longitudinal extensible bars 2 may be conventional extensible bars, such as a combination of at least one outer bar and one inner bar or may be a combination of much more tubular elements. In this embodiment, the longitudinal extensible bars 2 are bars. However, the present disclosure is not limited thereto, and thus the longitudinal extensible bars 2 may each be a rod or any other tubular element or may be a combination of a rod and a bar. Preferably, the cross section of each end of each longitudinal extensible bar 2 is a square or a rectangle, such that the vehicular radar auxiliary jig 100 stands steadily.

One end of each longitudinal extensible bar 2 is positioned distal to the transverse extensible bar 1 and provided with a tire securing portion 21. The tire securing portion 21 is adapted to be engaged with a tire of a vehicle (not shown) to prevent displacement of the vehicular radar auxiliary jig 100 relative to the vehicle during the radar mounting time period and the radar detecting time period. In this embodiment, the tire securing portion 21 has an oblique surface and thus is engagedly inserted into a front wheel or rear wheel of the vehicle from the front or rear of the vehicle. However, the present disclosure is not limited thereto, and thus the tire securing portion 21 can be provided in various forms, for example, a clamp for clamping a tire.

The two upright bars 3 are perpendicularly connected to two ends of the transverse extensible bar 1 and are perpendicular to the two longitudinal extensible bars 2, respectively. Therefore, the transverse extensible bar 1, the longitudinal extensible bars 2 and the upright bars 3 are perpendicular to each other.

One end of each upright bar 3 is positioned distal to the transverse extensible bar 1 and provided with a mounting portion 31, so as to be connected to an electromagnetic wave component. The electromagnetic wave component includes but is not limited to an electromagnetic wave emitting component (for example, a radar) and an electromagnetic wave reflecting component (for example, a radar reflecting board).

For instance, the mounting portion 31 is a clamp 31a for clamping an electromagnetic wave reflecting component (not shown). The head of the clamp 31a is changeable and adjustable in order to match electromagnetic wave reflecting components of different size and thickness.

Alternatively, the mounting portion 31 comprises a base 31c and an angle plotting board 31b. One end of the angle plotting board 31b is disposed at the base 31c. The angle plotting board 31b is adapted to mount an electromagnetic wave emitting component in place.

In this embodiment, the mounting portion 31 has both the clamp 31a and the angle plotting board 31b to clamp the electromagnetic wave reflecting component and mount the electromagnetic wave emitting component in place, respectively. However, the present disclosure is not limited thereto. In a variant embodiment, the mounting portion 31 has either the clamp 31a or the angle plotting board 31b to either clamp the electromagnetic wave reflecting component or mount the electromagnetic wave emitting component in place.

Figure 2:
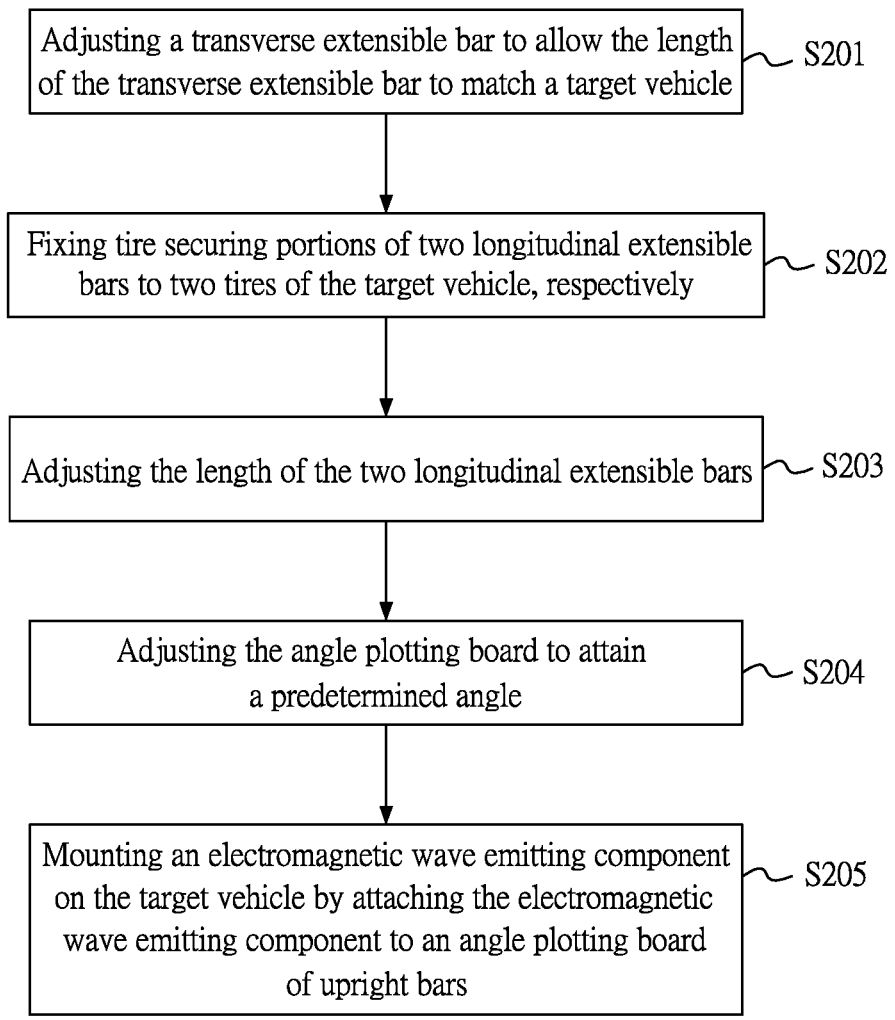
FIG. 2 is a schematic view of a process flow of vehicular radar mounting method according to an embodiment of the present disclosure.

Referring to FIG. 2, a vehicular radar mounting method of the vehicular radar auxiliary jig 100 is described below.

As shown in FIG. 2, in step S201, the transverse extensible bar 1 is adjusted to match the length of the transverse extensible bar 1 with a target vehicle (not shown). Preferably, the transverse extensible bar 1 matches the width of the target vehicle.

In step S202, the tire securing portions 21 of the two longitudinal extensible bars 2 are fixed to two tires of the target vehicle, respectively. Each tire securing portion 21 is engagedly inserted into a front wheel or rear wheel of the target vehicle from the front or rear of the target vehicle.

In step S203, the length of the two longitudinal extensible bars 2 is adjusted to attain the predetermined length required for performing a radar mounting operation.

In step S205, an electromagnetic wave emitting component (radar) is mounted on the target vehicle by being attached to the angle plotting board 31b. The mounting of a radar has strict requirements for multiple dimensions (location, height, and angle), and thus even a minor angle deviation can end up in failing the subsequent test. Thus, the vehicular radar auxiliary jig 100 and vehicular radar mounting method of the present disclosure provide the angle plotting board 31b whose angle has been configured; hence, no angle deviation will occur, provided that the radar component is mounted in place at the predetermined location of the target vehicle by being attached to the angle plotting board 31b.

In this embodiment, as shown in FIG. 1, the angle plotting board 31b is rotatably disposed at the base 31c, and graduations on the base 31c enable the angle of the angle plotting board 31b to be finely adjusted. To this end, step S205 of the vehicular radar mounting method of the present disclosure is preceded by step S204: adjusting the angle plotting board 31b to attain a predetermined angle. However, the present disclosure is not limited thereto. In a variant embodiment, the angle plotting board 31b may have a fixed angle in order to be suitable for use in mounting a vehicular radar in place.

Figure 3:
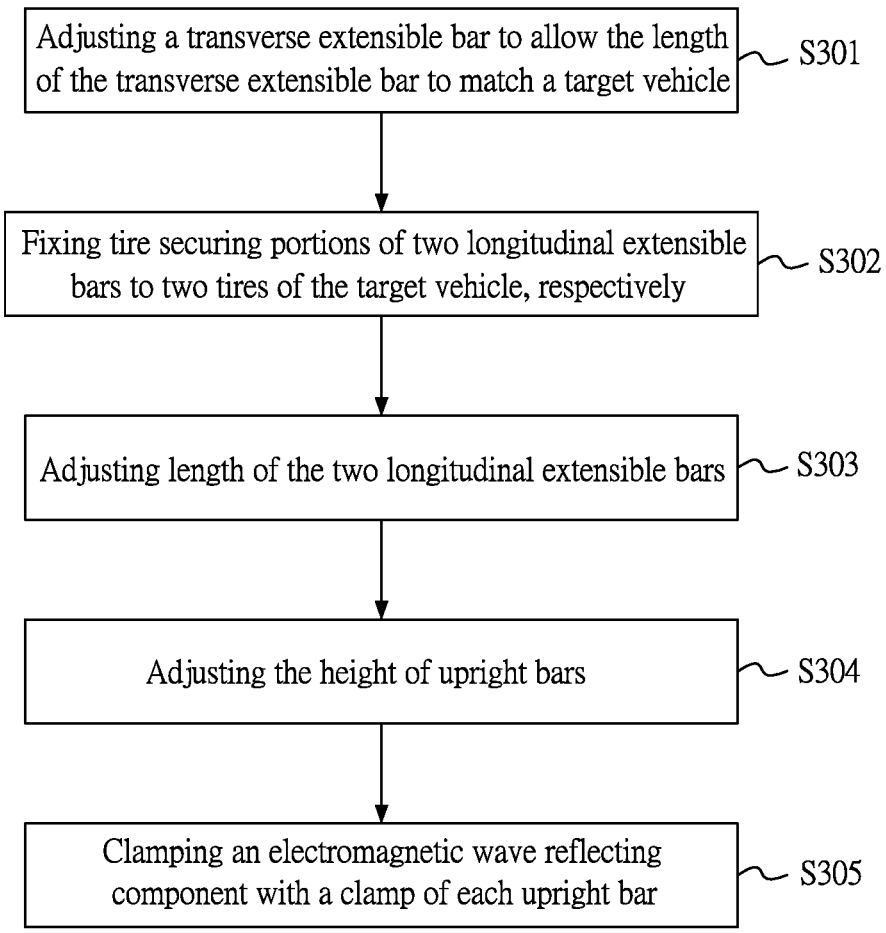
FIG. 3 is a schematic view of a process flow of vehicular radar detecting method according to an embodiment of the present disclosure.

Referring to FIG. 3, a vehicular radar detecting method of the vehicular radar auxiliary jig 100 is described below.

As shown in FIG. 3, in step S301, the transverse extensible bar 1 is adjusted to match the length of the transverse extensible bar 1 with a target vehicle (not shown). Preferably, the transverse extensible bar 1 matches the width of the target vehicle.

In step S302, the tire securing portions 21 of the two longitudinal extensible bars 2 are fixed to two tires of the target vehicle, respectively. Each tire securing portion 21 is engagedly inserted into a front wheel or rear wheel of the target vehicle from the front or rear of the target vehicle.

In step S303, the length of the two longitudinal extensible bars 2 is adjusted to attain the predetermined length required for performing a radar testing operation.

In step S305, an electromagnetic wave reflecting component (radar reflecting board) is clamped with the clamps 31a of the upright bars 3. Owing to the vehicular radar auxiliary jig 100, the distance between the target vehicle and the electromagnetic wave reflecting component is fixed and known; thus, the testing environment can achieve a unified standard to match a radar test program. The vehicular radar detecting method of the present disclosure is easier to operate, simpler and cheaper than its conventional counterpart.

Furthermore, as shown in FIG. 1, the transverse extensible bar 1, the longitudinal extensible bars 2 and the upright bars 3 have graduations in order to be precisely adjusted by a user to their predetermined length.

Furthermore, in this embodiment, the two upright bars 3 are also extensible bars. Likewise, the upright bars 3 can be extended adjustably in a longitudinal direction (Z axis of FIG. 1). The upright bars 3 may be conventional extensible bars, such as a combination of at least one outer bar and one inner bar or may be a combination of much more tubular elements. However, the present disclosure is not limited thereto, and thus the upright bars 3 may also be of a fixed height.

Since the height of the upright bars 3 is adjustable, step S305 of the vehicular radar detecting method of the present disclosure is preceded by step S304: adjusting the height of the upright bars 3, so as to adjust the height of the radar reflecting component.

While the present disclosure has been described by means of specific embodiments, numerous modifications and variations could be made thereto by those skilled in the art without departing from the scope and spirit of the present disclosure set forth in the claims.

What is claimed is:

1. A vehicular radar auxiliary jig, comprising:
   a transverse extensible bar;
   two longitudinal extensible bars perpendicularly connected to two ends of the transverse extensible bar, respectively, wherein an end of each said longitudinal extensible bar is positioned distal to the transverse extensible bar and provided with a tire securing portion, and the tire securing portion with an oblique surface is engagedly inserted into a front wheel of a vehicle from the front side or a rear wheel of a vehicle from the rear side; and
   two upright bars perpendicularly connected to two ends of the transverse extensible bar and are perpendicular to the two longitudinal extensible bars, respectively, wherein an end of each upright bar is positioned distal to the transverse extensible bar and provided with a mounting portion, so as to be connected to an electromagnetic wave component.

2. The vehicular radar auxiliary jig of claim 1, wherein the two upright bars are extensible bars.

3. The vehicular radar auxiliary jig of claim 1, wherein the mounting portion is a clamp for clamping an electromagnetic wave reflecting component.

4. The vehicular radar auxiliary jig of claim 1, wherein the mounting portion comprises a base and an angle plotting board having an end disposed at the base, and the angle plotting board is adapted to mount an electromagnetic wave emitting component in place.

5. The vehicular radar auxiliary jig of claim 4, wherein the angle plotting board is rotatably disposed at the base.

6. The vehicular radar auxiliary jig of claim 1, wherein the transverse extensible bar comprises two outer bars and an inner bar connecting the two outer bars.

* * * * *